United States Patent
Saito

(10) Patent No.: US 7,742,481 B2
(45) Date of Patent: Jun. 22, 2010

(54) MULTIPLEXER, MULTIMEDIA COMMUNICATION APPARATUS AND TIME STAMP GENERATION METHOD

(75) Inventor: Tatsunori Saito, Yokohama (JP)

(73) Assignee: Kabushiki Kaisha Toshiba, Kawasaki-shi (JP)

( * ) Notice: Subject to any disclaimer, the term of this patent is extended or adjusted under 35 U.S.C. 154(b) by 944 days.

(21) Appl. No.: 11/218,422

(22) Filed: Sep. 6, 2005

(65) Prior Publication Data
US 2005/0286431 A1  Dec. 29, 2005

Related U.S. Application Data

(62) Division of application No. 09/892,502, filed on Jun. 28, 2001, now Pat. No. 6,987,767.

(30) Foreign Application Priority Data
Jun. 30, 2000  (JP) .............................. 2000-200128

(51) Int. Cl.
*H04L 12/56* (2006.01)
(52) U.S. Cl. .................. 370/394; 370/537; 348/512
(58) Field of Classification Search ......... 370/532–544, 370/252, 509, 265–267, 477, 468, 508; 375/240.21, 375/240.26; 348/14.13, 425.3, 426.1, 423, 348/512, 515; 386/13, 85, 98, 99
See application file for complete search history.

(56) References Cited

U.S. PATENT DOCUMENTS

| 5,467,139 A | 11/1995 | Lankford |
| 5,867,230 A | 2/1999 | Wang et al. |
| 6,034,731 A * | 3/2000 | Hurst, Jr. ............... 375/240.26 |
| 6,081,299 A * | 6/2000 | Kesselring .................. 348/512 |
| 6,282,209 B1 | 8/2001 | Kataoka et al. |
| 6,754,273 B1 * | 6/2004 | Sackstein et al. ........ 375/240.21 |
| 2003/0179757 A1 * | 9/2003 | Ten Kate et al. ....... 370/395.61 |

OTHER PUBLICATIONS

Vetro et al., "Object-Based Transcoding for Scalable Quality of Service," IEEE ISCAS (May 28, 2000), 4:IV-17-IV-20.
Assunção et al., "Transcoding of single-layer MPEG video into lower rates," IEEE Proc.-Vis. Image Signal Process (Dec. 1997), 144:377-383.

* cited by examiner

*Primary Examiner*—Frank Duong
*Assistant Examiner*—Habte Mered
(74) *Attorney, Agent, or Firm*—Finnegan, Henderson, Farabow, Garrett & Dunner, L.L.P.

(57) ABSTRACT

In order to allow the generation of a time stamp in consideration of a frame skip even in the case where the frame skip is generated, a PES generation section of a multiplexer detects the number of skipped frames by analyzing elementary video streams output from a video encoder to determine a PTS on the basis of the time difference between frames calculated on the basis of the number of skipped frames. Then, a frame to which a PTS is to be placed with the above stream analysis is cut out to insert the PTS into a PES header of this frame to be transmitted to the transmission channel.

7 Claims, 7 Drawing Sheets

PES packet information

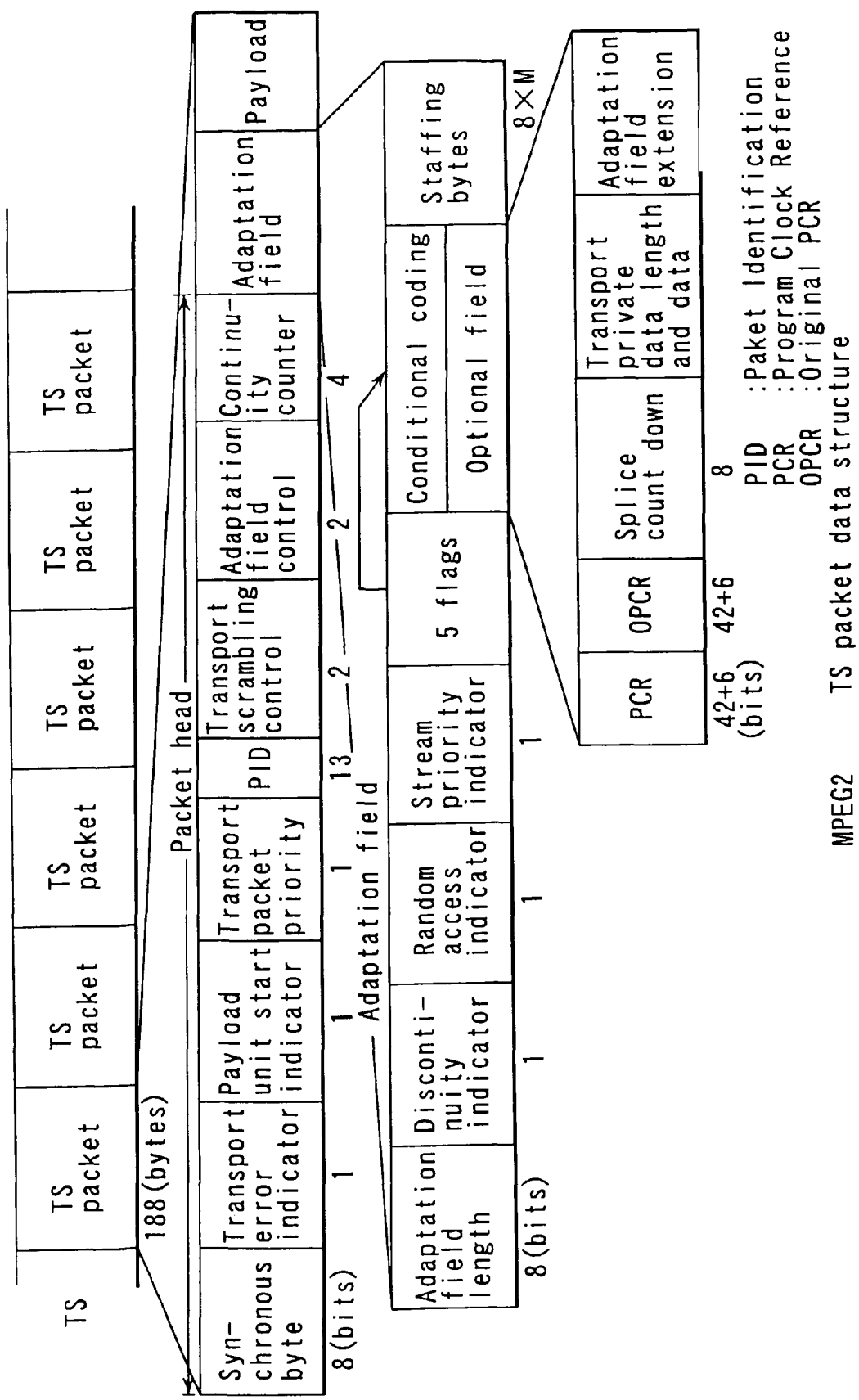
FIG. 7 MPEG2 TS packet data structure

MULTIPLEXER, MULTIMEDIA COMMUNICATION APPARATUS AND TIME STAMP GENERATION METHOD

CROSS-REFERENCE TO RELATED APPLICATIONS

This is a Divisional of application Ser. No. 09/892,502, filed Jun. 28, 2001, now U.S. Pat. No. 6,987,767 which is incorporated in its entirety herein by reference. This application is also based upon and claims the benefit of priority from the prior Japanese Patent Application No. 2000-200128, filed Jun. 30, 2000, the entire contents of which are incorporated herein by reference.

BACKGROUND OF THE INVENTION

The present invention relates to a multiplexer provided with a function for multiplexing a plurality of kinds of media information, a multimedia communication apparatus provided with this multiplexer, and a time stamp generation method used in the multiplexer.

As a system for respectively coding a plurality of items of media information of different types, such as video, audio, data or the like, followed by multiplexing and transmitting such information, an MPEG (Moving Picture Experts Group) system is known.

For example, the in MPEG-2 system, a communication apparatus on the sending side encodes a plurality of items of the media information such as video data, audio data or the like while maintaining respective linkages to generate encoded elementary streams. Next, these encoded elementary streams are converted into packets which are referred to as PES (Packetized Elementary Streams). Each PES is a packet having a variable length and comprises a PES header and a PES payload. The PES header includes a packet start code, a packet length, a flag, control information, PES header length, and conditional coding information. The conditional coding information includes a presentation time stamp (PTS). The PTS is time information required for the device on the receiving side for displaying and outputting a plurality of items of media information such as the video data or audio data while maintaining a time linkage.

Next, each of the above PES is divided into a fixed length as shown in FIG. 6. Then, this divided PES is subsequently inserted into each of the TS packets of a transport stream (TS). The TS packet is a packet having a fixed length, and comprises 4-byte TS header, an adaptation field, or a payload or both. In the adaptation field, a control signal is inserted which is required for the transmission and staffing of information such as PCR (Program Clock Reference) or the like.

Into the TS header, as shown in FIG. 7, a synchronous byte, a transport error indicator, a payload unit start indicator, transport priority information, packet identification information (PID: Packet Identification), transport scramble control information, an adaptation field control flag, and a cyclic counter are inserted in order. Among them, the adaptation field control flag represents the presence or absence of the adaptation field or the payload. The PID is a number for identifying the PES, and is represented by 13 bits. One PES is divided and inserted into the payload of a plurality of TS packet having the same PID to be transmitted. The transport scramble control information represents the presence or absence of the scrambling with respect to the TS payload.

On the other hand, the communication apparatus on the receiving side separates a TS packet into which the video PES and audio PES constituting a program which the user desires to watch and listen to are inserted from the transport stream transmitted from the communication apparatus on the receiving side. Then, the video PES and audio PES of this separated TS packet are respectively decoded with a decoder, and this decoded video data and audio data are reproduced by taking time correspondence therebetween. The time correspondence between this video data and audio data is taken on the basis of the PTS inserted into the PES header.

However, in the video encode scheme, for example, like the encode scheme represented by MPEG-4 Visual, there is an encode scheme in which an irregular frame skip is likely to be generated in a frame of the video data which is encoded. When the encode scheme of this type is used, there is a case in which a correct PTS cannot be added to the PES after conversion in a multiplexer under the influence of the frame skip.

Here, the frame skip refers to a phenomenon in which the encoding with respect to several frames is omitted. This frame skip is generated, for example, in the case where a target bit rate cannot be obtained due to an increase in code quantity generated in encoding. In the absence of the skip frame, there is a case in which a remarkable lowering of the allocated code quantity is caused. In particular, the encode scheme regulated with MPEG-4 Visual is an ultra-low bit rate encode scheme, so that the irregular frame skip is likely to be generated.

The conventional multimedia communication apparatus presupposed on MPEG-2 system does not have a constitution in which the frame skip is considered. As a consequence, with respect to the encoding video data after the generation of the frame skip, a correct time stamp cannot be added. Consequently, in the communication apparatus on the receiving side, video data cannot be reproduced by allowing the video data to take time correspondence to the other media information such as audio data or the like.

BRIEF SUMMARY OF THE INVENTION

An object of the present invention is to enable the generation of a time stamp in consideration of this frame skip even in the case where a frame skip is generated with the encode processing. Then, an object of the present invention is to provide a multiplexer which enables reproduction of a plurality of items of media information by taking time correspondence at all times, a multimedia communication apparatus provided with this multiplexer and a time stamp generation method.

In order to attain the above object, the present invention is constituted in such a manner that a plurality of encoded data streams are packetized respectively, a time stamp is inserted which is required for the reproduction of the encoded data streams into these packets, and the number of skipped frames is detected from the encoded information data stream in the multiplexer for multiplexing the packets. Then, on the basis of the detected number of this detected skipped frame, a time stamp is generated which is to be inserted into the packet of the encoded data streams.

Consequently, according to the present invention, when the encoded data streams are input, the number of skipped frames is detected from these data streams so that the time stamp is generated on the basis of the number of detected skipped frames. Therefore, it is possible to insert the time stamp in consideration of the frame skip into the header and transmit the same. As a consequence, like MPEG-4 Visual or ITU-T H.263, even in the case where a encode scheme is adopted in which there is a possibility that an irregular frame skip is generated in the video frame, it becomes possible, in the communication apparatus on the receiving side, to reproduce video data by taking time correspondence with other media information such as audio, data or the like. That is, even in the case where the frame skip is generated in the encode processing, a plurality of items of media information can be synchronously reproduced.

It is preferable that the detection processing of the number of skipped frames is conducted on the basis of the time difference between a current frame of the encoded data stream and the past frames prior to the current frame. Specifically, on the basis of the time difference is detected on the basis of a first local time stamp which is added to the current frame of the encoded data stream and a second local time stamp which is added to the past frame prior to the current frame, so that the number of skipped frames is detected on the basis of the detected time difference. When doing so, the number of frame skips which are actually generated (number of skipped frames) can be accurately detected. As a consequence, it becomes possible to insert a correct time stamp corresponding to the number of actual skipped frames into the packet header.

Furthermore, determination is made as to whether the encoded streams include frame skips prior to the detection processing of the number of skipped frames. Then, only in the case where determination is made that the encoded streams include the frame skips, it is more preferable that the number of skipped frames is detected. By doing so, in the case where the encode scheme is employed in which there is no possibility that the frame skip is generated, the detection processing for detecting the number of skipped frame is omitted. As a consequence, the processing burden of the multiplexer is alleviated so that the consumed power can be decreased.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently embodiments of the invention, and together with the general description given above and the detailed description of the embodiments given below, serve to explain the principles of the invention.

FIG. 7 is a view showing a data structure of a TS packet in MPEG-2 system.

DETAILED DESCRIPTION OF THE INVENTION

First Embodiment

There is available an MPEG-4 system as an encode scheme in which a frame skip is likely to be generated. In the MPEG-4 standard, encoded data is allowed to be sent in the multiplexed stream form of MPEG-2. Then, a first embodiment of the present invention will be explained by taking an example of a case in which a video data and an audio data encoded with MPEG-4 is multiplexed with the multiplexed stream form regulated with MPEG-2 to be transmitted.

Figure 1:
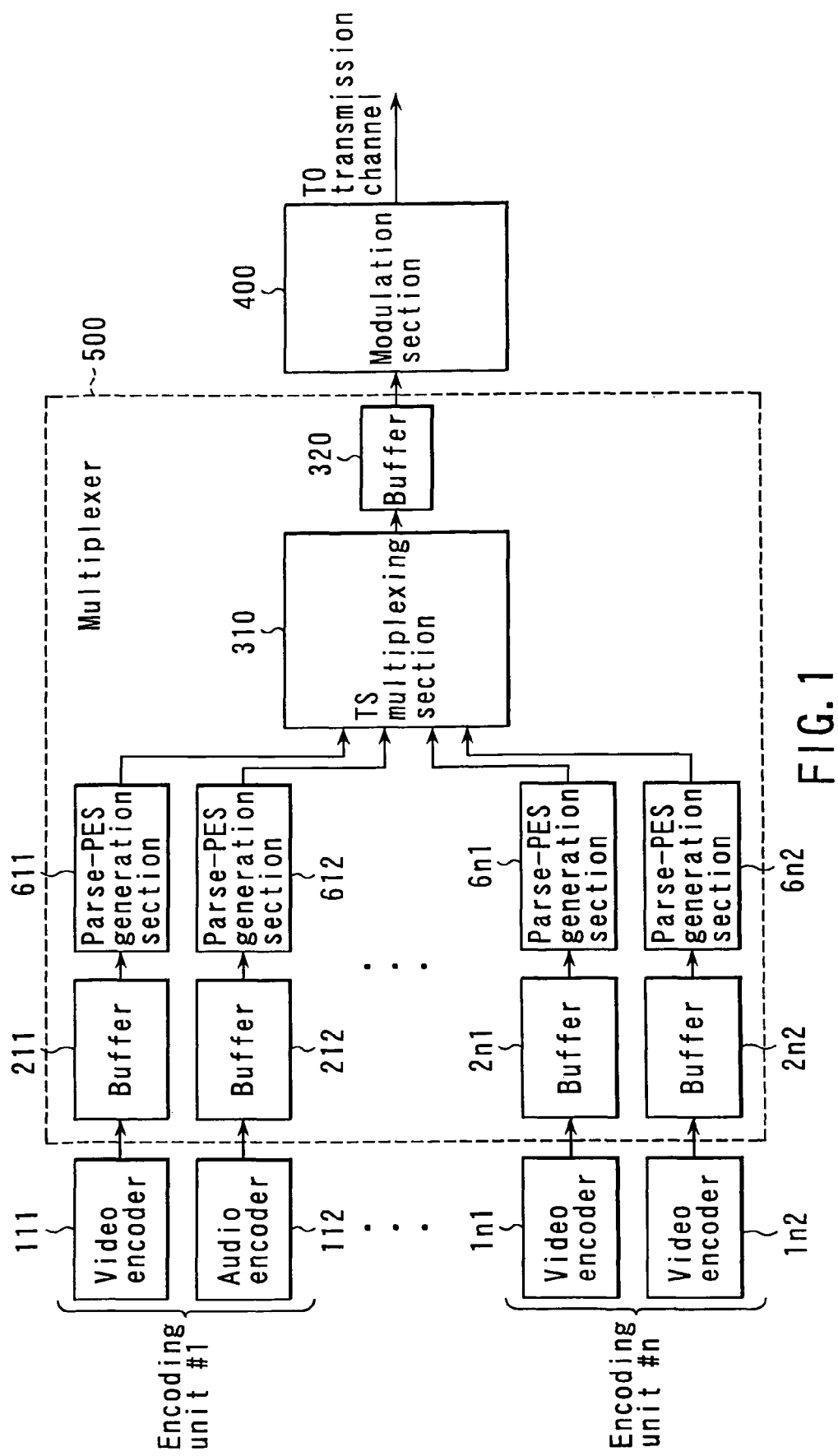
FIG. 1 is a block diagram showing a structure of a multiplexer and a peripheral circuit thereof according to a first embodiment of the present invention.

FIG. 1 is a block diagram showing a structure of a multiplexer and a peripheral circuit according to the first embodiment of the present invention.

In a multimedia communication apparatus on the sending side of an MPEG-2 system, a plurality of encoding units #1 to #n corresponding to the number of programs to be transmitted are provided. These coding units #1 to #n comprise video encoders 111 to 1$n$1 and audio encoders 112 to 1$n$2 respectively. The video encoders 111 to 1$n$1 correspond to MPEG-4 Visuals respectively. The audio encoders 112 to 1$n$2 also correspond to MPEG-4 Audios respectively.

Incidentally, each of the coding units #1 to #n are not limited to the video encoders and audio encoders. For example, the units may include data encoders for encoding document data or the like of personal computers or the like.

By the way, in the multimedia communication apparatus on the sending side, a multiplexer 500 and a modulation section 400 are provided for multiplexing and transmitting an MPEG-2 transport stream. The modulation section 400 conducts modulation processing for transmitting a transport stream (TS) output from the multiplexer 500 to a transmission channel.

The multiplexer 500 is provided with a plurality of buffers 211 to 2$n$1, and 212 to 2$n$2. These buffers 211 to 2$n$1, and 212 to 2$n$2 correspond to the encoders 111 to 1$n$1 and 112 to 1$n$2 one to one, respectively. The buffers 211 to 2$n$1 and 212 to 2$n$2 temporarily store elementary video streams (encoded video data) output from the video encoders 111 to 1$n$1 or elementary audio streams (encoded audio data) output from the audio encoders 112 to 1$n$2. The streams stored in the buffers 211 to 2$n$1 and 212 to 2$n$2 are input to the parse-PES generation sections 611 to 6$n$1, and 612 to 6$n$2 respectively.

The parse-PES generation sections 611 to 6$n$1, and 612 to 6$n$2 conduct processing for analyzing the structure of the input elementary stream and processing for converting the elementary stream to the PES. Then, the PES obtained in each of the parse-PES generation sections 611 to 6$n$1 and 612 to 6$n$2 is supplied to the transport stream multiplexing section (TS multiplexing section) 310 respectively.

Figure 6:
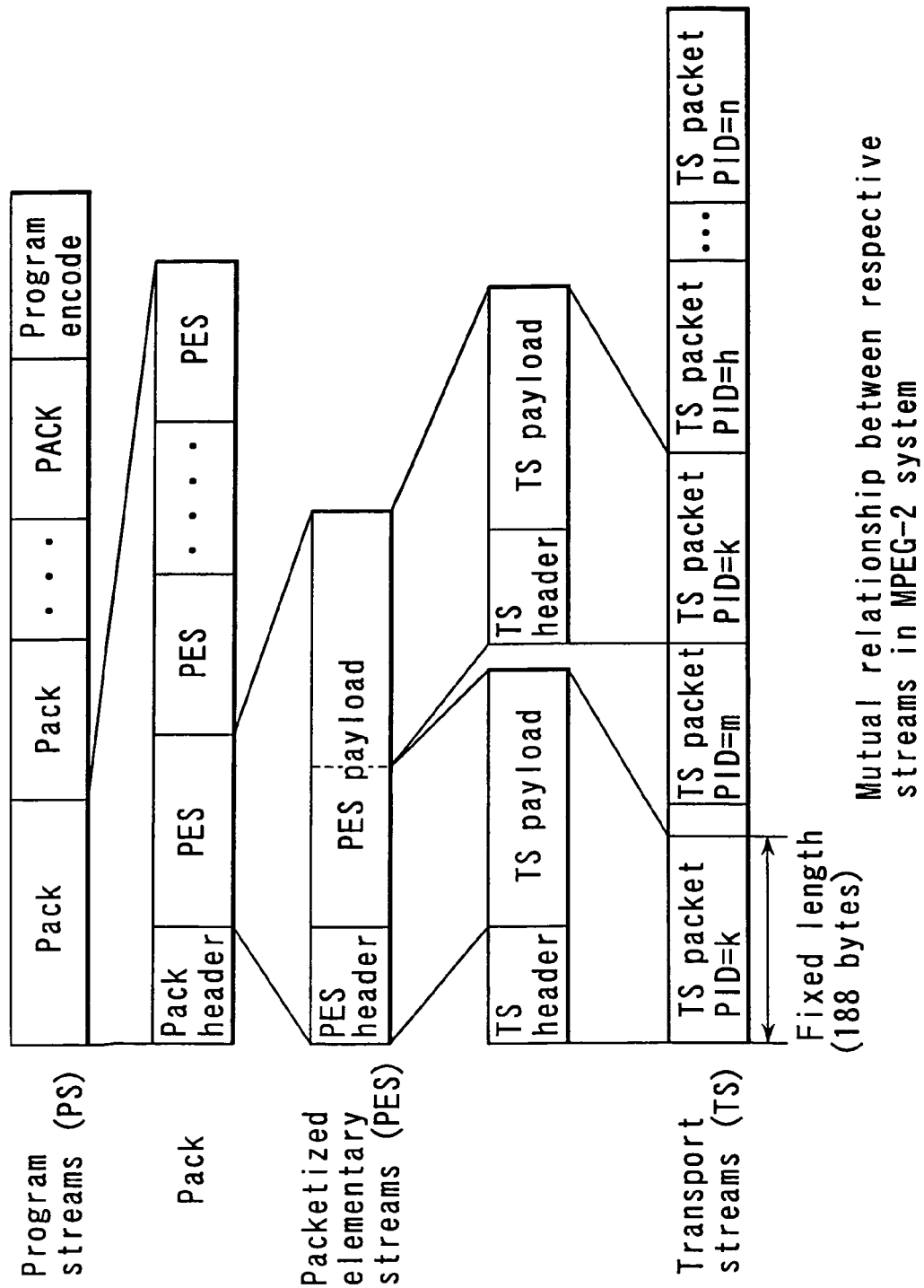
FIG. 6 is a view showing a mutual relationship between the respective streams in MPEG-2 system.

The TS multiplexing section 310 partitions each of the PES supplied from each of the parse-PES generation sections 611 to 6$n$1 and 612 to 6$n$2 by a predetermined length as shown in FIG. 6. By subsequently inserting the partitioned PES into the TS packets, the PES are multiplexed on the transport stream (TS). Furthermore, into the header of each of the TS packets, as shown in FIG. 7, a synchronous byte, a transport error indicator, a payload unit start indicator, transport priority information, packet identification information (PID: Packet Identification), transport scramble control information, an adaptation field control flag, and a cyclic counter are inserted in order. Into the PID, a number is inserted which is defined in correspondence to each of the programs #1 to #n.

The transport stream output from the TS multiplexing section 310 is input to the modulation section 400 via a buffer 320. The modulation section 400 converts the input transport streams into a signal form required for transmitting the streams on the transmission channel to transmit the transmission signal generated with the conversion to the transmission channel. As the transmission channel, a radio transmission channel and a wire transmission channel are available.

Figure 2:
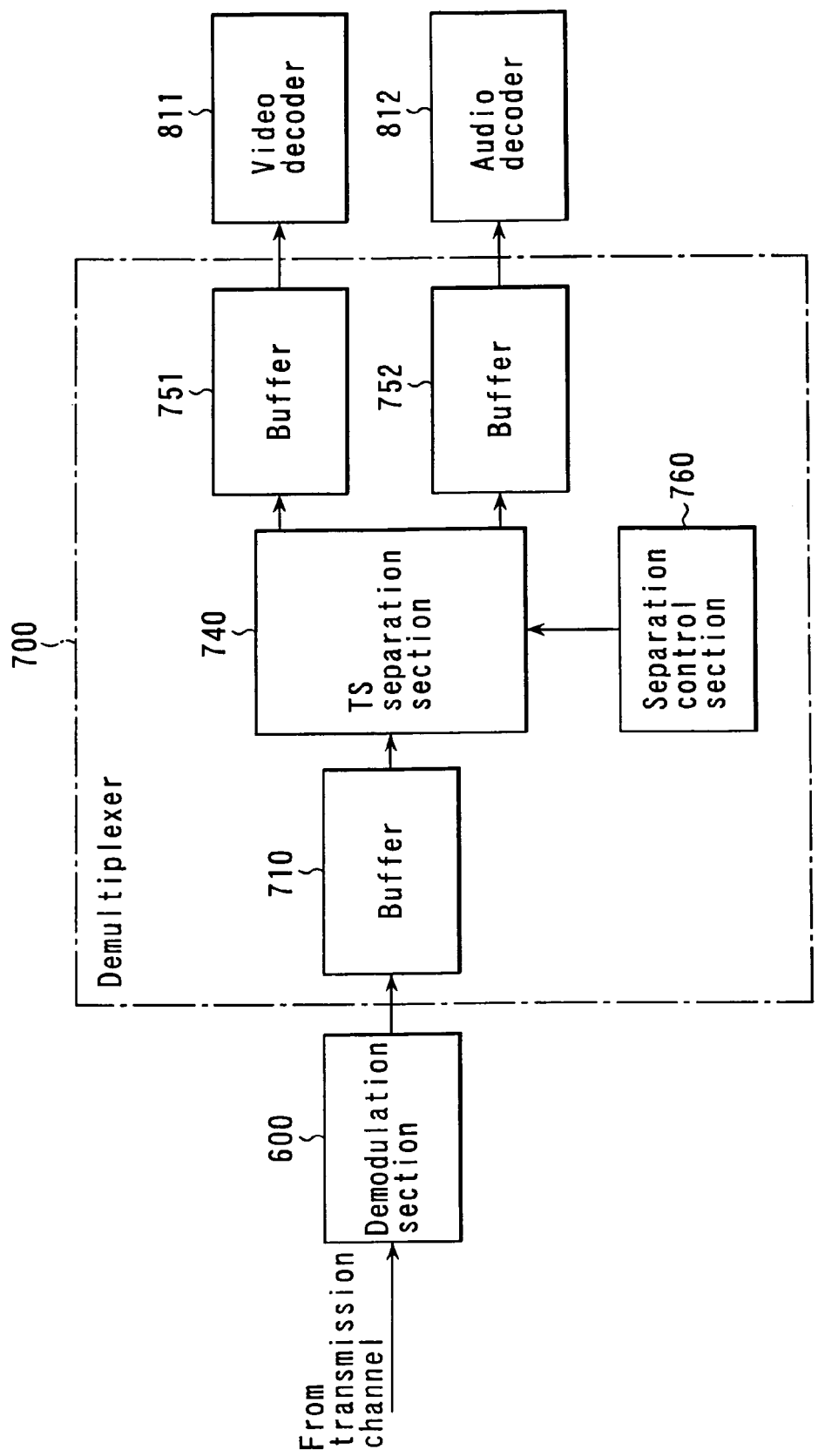
FIG. 2 is a block diagram showing a structure of a demultiplexer and a peripheral circuit thereof according to the first embodiment of the present invention.

On the other hand, the demultiplexer provided on the multimedia communication apparatus on the receiving side of the MPEG-2 system is constituted in the following manner. FIG. 2 is a block diagram showing a structure of the demultiplexer and a peripheral circuit.

A transmission signal which arrives via the transmission channel from the multimedia communication device on the sending side is input to a demodulation section 600. The demodulation section 600 demodulates the transmitted signal to the transport stream. This demodulated transport stream is input to the demultiplexer.

A demultiplexer 700 has a buffer 710. Then, the transport streams demodulated with the buffer 710 are stored in the buffer 710. A TS separation section 740 conducts the following processing in accordance with the program designation information given from a separation control section 760.

That is, from the transport stream stored in the buffer, a program association table PAT (TS packet of PID=0×0000) is extracted in the beginning. Then, from the PAT, the PID of the program map table PMT on which the control information of the program designated with the above program designation information is described is detected. Next, the PMT is extracted on the basis of the PID, so that the PID of the video streams and the PID of the audio streams are detected respectively on the basis of the description of the PMT. After that, the TS packet having each of these detected PID's described thereon is selectively separated from the transport stream. Then, each of this separated PS packet is supplied to a video decoder 811 or audio decoder 812 via the buffer 751 and 752.

The video decoder 811 and the audio decoder 812 read the TS packets from the buffers 751 and 752 respectively, and the video PES and the audio PES inserted into the payload of this TS packet are decoded into the elementary video streams and elementary audio streams. Then, these streams are supplied to a display and a speaker not shown after taking a mutual time correspondence in accordance with the PTS included in the PES header of the above video PES and the audio PES.

Next, an operation of a system constituted as described above will be explained.

In the beginning, in the multimedia communication apparatus on the sending side, the video data and the audio data are encoded respectively with the video encoders 111 to 1$n$1 and audio encoders 112 to 1$n$2 for every program, so that elementary video streams and elementary audio streams are provided. Then, these elementary video streams and elementary audio streams are input to the parse-PES generation section 611 to 6$n$1, 612 to 6$n$2 via buffers 211 to 2$n$1, and 212 to 2$n$2.

The elementary audio streams input to the parse-PES generation sections 612 to 6$n$2 do not generally generate frame skips. The reproduction time of the audio frames is determined with the number of samples and the sampling frequency. As a consequence, after the parse-PES generation sections 612 to 6$n$2 recognize the partition of frames with the analysis processing of streams, the PTS can be easily calculated in accordance with the mathematical expression shown hereinbelow. In the MPEG-2 system, the PTS must be represented at the precision of 90 KHz.

The calculation equation of the n-th frame in the audio data can be represented in the following manner.

$$PTS(\textit{n-th} \text{ frame}) = PTS \text{ initial value} + 90000 \times n \times (\text{number of sample frames/sampling frequency}) \quad (1)$$

On the other hand, in the case where the video data is encoded with the encode scheme of MPEG-4 visual, the elementary video streams are likely to generate irregular frame skips. As a consequence, in the case where MPEG-4 Visual is used as the video encode scheme, the PTS cannot be calculated simply.

Then, in the case where the PTS of the elementary video streams is calculated, a method is used which is different from the method for calculating the PTS of the elementary audio streams. That is, in the beginning, the parse-PES generation sections 611 to 6$n$1 conduct a stream analysis with respect to the input elementary video streams so that information on frame skips is extracted. Then, on the basis of information on the extracted frame skips, the PTS is calculated. Furthermore, the parse-PES generation sections 611 to 6$n$1 extract information on the frame skips and, at the same time, cuts out frames into which the PTS is to be inserted. Then, the PTS which is determined from the calculation is inserted into the PES header of the frames that are cut out.

Figure 3:
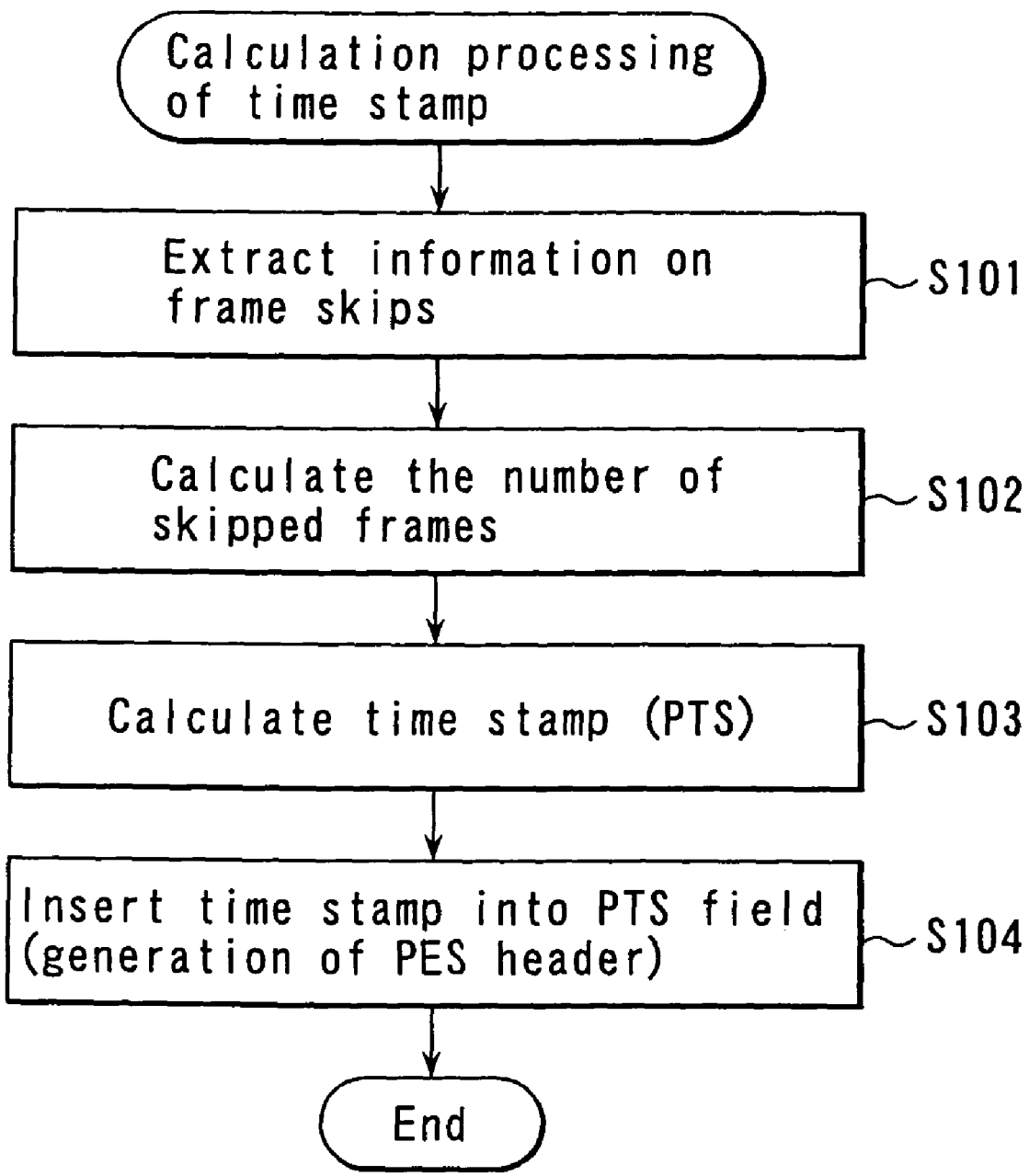
FIG. 3 is a flowchart showing a procedure of a time stamp calculation processing by a parse-PES generation section of the multiplexer shown in FIG. 1.

Next, by referring to the flowchart shown in FIG. 3, there will be explained a concrete example of a calculation processing of the time stamp which is to be inserted into the elementary video streams.

MPEG-4 Visual does not have information which directly represents the frame skips. Therefore, it is necessary to calculate the number of frames which are skipped. For this calculation, the local time stamp which is incorporated in the MPEG-4 visual itself is used. The local time stamp refers to time which is given from the video encoder to each frame when the original video data is input to the video encoder. The local time stamp is generated on the basis of time of a clock incorporated in the video encoder.

That is, in the beginning, the parse-PES generation sections 611 to 6$n$1 conduct the constitution analysis of streams with respect to the input elementary video streams to extract the local time stamp as information on the frame skip (step S101). The local time stamp shows the frame input time of the original video data in the video encoders 111 to 1$n$1 as described above. Consequently, in the MPEG-4 Visual, each time of the n-th frame and the n+1-th frame are calculated respectively in the following manner.

$$\textit{n-th} \text{ frame time} = \text{initial time} + n \times (1001/30000)$$

$$\textit{n+1-th} \text{ frame time} = \text{initial time} + (n+1) \times (1001/30000) \quad (2)$$

In this calculation example, there is shown a case in which the frame frequency is about 29.97 Hz. As a consequence, (1001/30000) represents the frame interval $\frac{1}{29.97}$ sec.

Next, the number of frames which are skipped is calculated from a difference between the time of the n-th frame and the time of the n+1-th frame (step S102). That is, the parse-PES generation sections 611 to 6$n$1 store the time of the past one frame (n). Then, a difference between time of the current frame (n+1) and time of the past one frame (n) is calculated. Then, this calculated difference is divided by 1001/30000, and the result thereof is set as the number of frames which are skipped. Incidentally, in the case of the difference=1001/30000, determination is made that no frame skip is generated. The elementary video streams in this case become a continuous stream.

When the number of skipped frames are calculated in this manner, the parse-PES generation sections 611 to 6$n$1 calculate the PTS corresponding to the current frame in consideration of the number of skipped frames which are calculated (step S103). In the case where the current frame is n+1, the PTS is calculated from the following mathematical expression.

$$PTS\ (n+1-th\ \text{frame}) = PTS\ (n-th\ \text{frame}) + 90000 \times \quad (3)$$
$$\text{number of skipped frames} \times$$
$$(1001/30000)$$
$$= PTS\ (n-th\ \text{frame}) + 90000 \times$$
$$(n+1-th\ \text{frame time} -$$
$$n\ \text{frame time})$$

However, in the above mathematical expression (3), there is assumed a case in which the PTS is represented at a precision of 90 KHz.

Then, when the PTS is calculated, the parse-PES generation sections 611 to 6n1 insert the above PTS into the PES header (step S104). Thus, the PES header including a correct PTS in consideration of the frame skip is generated.

Even when irregular frame skips are generated in the encode scheme by MPEG-4 by adopting the above PTS generation method, it becomes possible to shift the value of PTS in time by the time corresponding to the number of skipped frames later. Consequently, in the multimedia device on the receiving side, the video data is displayed in the state in which the video data is constantly synchronized with other media such as audio data or the like in time.

The PES output from the parse-PES generation sections 611 to 6n1, and 612 to 6n2 in this manner is next input to the TS multiplexing section 310. At the TS multiplexing section 310, the video PES and the audio PES of a plurality of programs are divided by a fixed length respectively to be subsequently inserted into the TS packet so that the video PES and the audio PES are multiplexed into transport streams (TS). Then, the video PES and the audio PES are sent to the modulation section 400 via the buffer 320 to be sent to the transmission channel.

In contrast, at the multimedia device on the receiving side, as soon as a transmission signal arrives from the transmission channel, the transmission signal is demodulated with the demodulation section 600 to be transport streams and the transport streams are stored in the buffer 710.

At the TS separation section 740, the PAT (PID=0x0000) is extracted in the beginning from the receiving transport streams in accordance with the program designation information given from the separation control section 760, and the PID of the PMT in which the control information of the designated program is described is detected from this PAT. Then, on the basis of the PID, the PMT is extracted and the PID of the video streams and the PID of the audio streams are detected respectively from the description of the PMT.

Next, the TS packet into which the PID is inserted is selectively separated and extracted from the receiving transport streams. Each of the separated TS packets is supplied to the video decoder 811 and the audio decoder 812 via buffers 751 and 752. The video decoder 811 and the audio decoder 812 respectively reproduce video data and audio data by referring to the PTS stored in the buffers 751 and 752.

As has been described above, according to the first embodiment, the number of frame skips generated in MPEG-4 encode processing, namely the number of skipped frames is calculated from a difference between the n+1-th frame time and the n-th frame time. Then, in consideration of the calculated number of skipped frames, the value of the PTS is allowed to coincide with the input time of the original video data before encoding. Consequently, at the multimedia communication apparatus on the receiving side, the video data can be constantly reproduced by taking time correspondence with other media information such as audio data or the like. Thus, high quality multimedia information communication can be achieved.

Second Embodiment

A second embodiment of the present invention uses a mobile communication terminal provided with a video and voice communication function as a multimedia communication apparatus and is provided with a time stamp generation function described in the first embodiment on the multiplexer of this mobile communication terminal.

Figure 4:
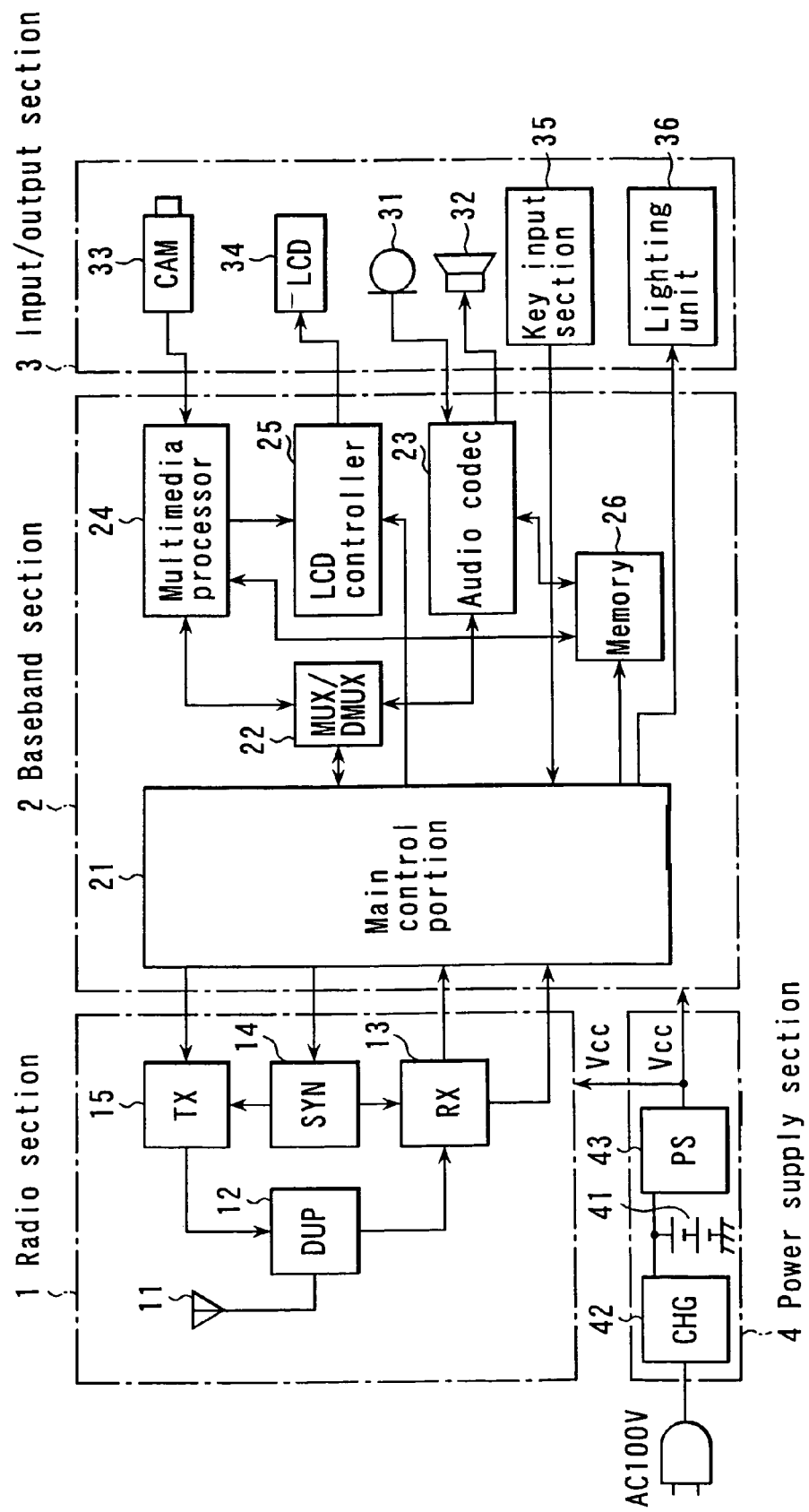
FIG. 4 is a block diagram showing a structure of a mobile communication terminal according to a second embodiment of a multiplexer according to this invention.
Figure 5:
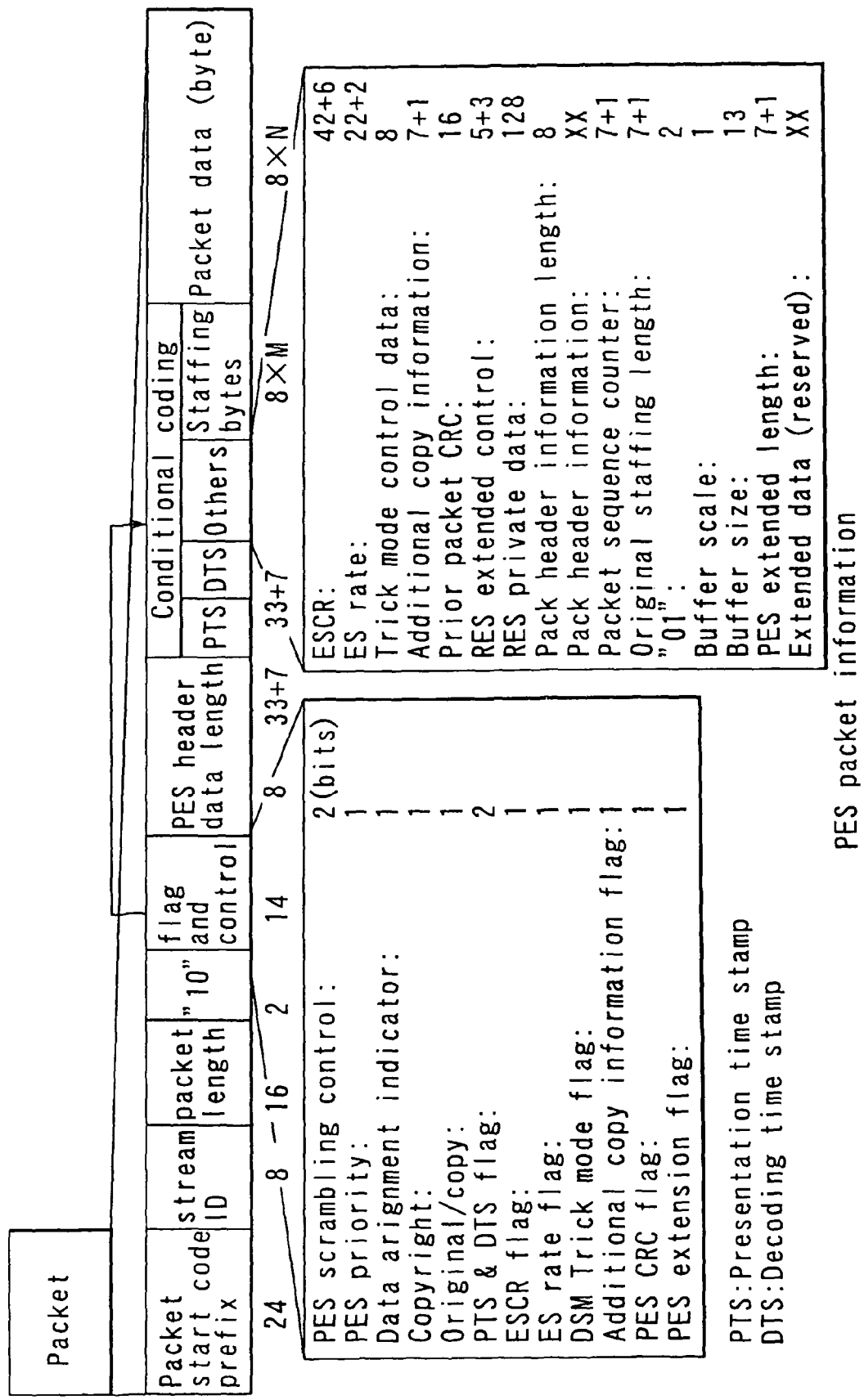
FIG. 5 is a view showing a data structure of the PES in an MPEG-2 system.

FIG. 4 is a block diagram showing a structure of a mobile communication terminal according to a second embodiment of a multimedia communication apparatus of the present invention. This mobile communication terminal comprises a radio section 1, a baseband section 2, an input/output section 3 and a power supply section 4.

In FIG. 4, a radio signal which arrives from the base station (not shown) via a radio channel is input to a receiving circuit (RX) 13 via a duplexer (DUP) after being received by an antenna 11. The receiving circuit 13 is provided with a low noise amplifier, a frequency converter, and a demodulator. Then, after the low noise of the radio signal is amplified with the low noise amplifier, the intermediate frequency signal is downconverted to an intermediate frequency signal or the base band signal by the frequency converter. This frequency is downconverted by mixing the radio signal with an oscillation signal of the receiving station generated from a frequency synthesizer (SYN) 14. An output signal of the frequency converter is digitally demodulated with the demodulator. As the demodulation scheme, for example, a demodulation scheme corresponding to the QPSK (Quadrature Phase Shift Keying) and a reverse spectrum diffusion scheme are used. Incidentally, the frequency of the receiving station oscillation signal generated from the frequency synthesizer 14 is instructed from a main control section 21 provided on the base band section 2.

The demodulation signal output from the demodulation section is input to the base band section 2. The base band section 2 comprises the main control section 21, a multiplexer/demultiplexer (MUX/DEMUX) 22, an audio encoder/decoder (hereinafter referred to as an audio codec) 23, a multimedia processor 24 an LCD controller 25 and a memory 26.

The main control section 21 judges whether or not the input demodulation signal is a control information or transport stream (TS) obtained by multiplexing the multimedia information. Then, when the demodulation signal is the TS, the signal is input to the multiplexer/demultiplexer 22. The multiplexer/demultiplexer 22 separates the input TS into the video PES and the audio PES. Then, the video PES is input to the video decoder in the multimedia processor 24, and the audio PES is input to the audio decoder in the audio codec 23 respectively. The video decoder reproduces video data by demodulating the input video PES, and this video data is supplied to the LCD controller 25. The LCD controller 25 supplies and displays the supplied video data to the LCD 34 of the input/output section 3. In contrast, the audio decoder demodulates the input audio PES, reproduces the audio data, and supplies and outputs this audio data to the speaker 32 of the input/output section 3.

Furthermore, even in the case where the video data and the audio data stored in the memory 26 are reproduced and output, these items of data are input to the audio codec 23 and the multimedia processor 24 respectively. After the audio data is decoded with the audio decoder in the audio codec 23, and is then output from the speaker 32. Further, after the video data is decoded with the video decoder in the multimedia processor 24, the video data is supplied to the LCD 34 via the LCD controller 25 and is displayed.

Incidentally, the LCD 34 also displays various information representing the operation state of the terminal, output from the main control section 21. For example, a phone book, strength of radio waves, remaining battery life, etc.

In contrast, a speech signal of a user output from the microphone 31 of the input/output section 3 is input to the audio codec 23 of the base band section 2. The audio codec 23 encodes the speech signal with an audio encoder. Then, this encoded audio data is input to the multiplexer/demultiplexer 22. On the other hand, the video data output from a camera (CAM) 33 is input to the multimedia processor 24 of the base band section 2. The multimedia processor 24 encodes the input video data in accordance with the encode scheme regulated to MPEG-4, and the encoded video data is input to the multiplexer/demultiplexer 22.

The multiplexer/demultiplexer 22 multiplexes the encoded video data and the encoded audio data in accordance with a predetermined format regulated with MPEG-2 to generate transmission transport streams (TS). This multiplexed transmission TS is input to a transmission circuit (TX) 15 of the radio section 1 from the main control section 21.

The transmission circuit 15 is provided with a modulator, a frequency converter and a transmission power amplifier. After the above transmission TS is digitally modulated with the modulator, the TS is up converted to the radio signal with the frequency converter. This upconversion is conducted by mixing the above transmission TS with the transmission station oscillation signal generated from the frequency synthesizer 14. As a modulation scheme, there are available the QPSK, and a spectrum diffusion scheme using the diffusion code. Then, after this generated transmission radio signal is amplified to a predetermined transmission level by the transmission power amplifier, the signal is sent to the antenna 11 via the duplexer 12, so that the signal is sent from this antenna 11 to a station not shown.

Incidentally, the power supply section 4 is provided with a battery 41 such as a lithium battery or the like, a charging circuit 42 for charging on the basis of a commercial power supply output (for example, AC100V) and a voltage generation circuit (PS) 43. The voltage generation circuit 43 comprises, for example, a DC/AC converter, and generates a predetermined power supply voltage Vcc on the basis of the output voltage of the battery 41.

Furthermore, the input/output section 3 is provided with, for example, a lighting unit 36 which is referred to as a back light or an illumination. This lighting unit 36 illuminates the LCD 34 and the key input section 35 when the keys are being used, or communication is being made. A vibrator 6 is used as means of notifying of an incoming call, and operates in accordance with the drive control signal from the main control section 2.

Incidentally, the above multiplexer/demultiplexer 22 is constituted in the following manner. In the beginning, the multiplexer is provided with a multiplexing processing function corresponding to a set of encoding units #1. That is, the multiplexer is provided with buffers 211 and 212, parse-PES generation sections 611 and 612, a TS multiplexing section 310 and a buffer 320 for each circuit constituting the multiplexer shown in FIG. 1.

Buffers 211 and 212 temporarily store encoded video data output from the video encoder in the multimedia processor 24, and encoded audio data output from the audio encoder in the audio codec 23 respectively.

The parse-PES generation section 611 conducts analysis processing of streams in the beginning with respect to the input encoded video, data, so that data on the frame skip is extracted. Then, the PTS is calculated on the basis of this extracted data on the frame skip. In this PTS calculation, the number of skipped frames is calculated by using the local time stamp of MPEG-4 Visual. Next, the time difference between frames is calculated on the basis of the number of skipped frames which has been calculated. The calculation of the PTS is conducted by determining the PTS on the basis of this time difference.

Furthermore, the parse-PES generation sections 611 and 612 cut out frames into which the PTS is to be inserted at the same time with the calculation processing of the PTS. Then, the PTS which is determined in the above calculation is inserted into the PES header of this cut out frames.

Then, the PES output from the parse-PES generation sections 611 and 612 is input to the TS multiplexing section 310. At the TS multiplexing section 310, the video PES and the audio PES of a plurality of programs are respectively divided into a fixed length to be subsequently inserted into the TS packets, so that the video PEA and the audio PES are multiplexed into transport streams (TS). Then, the transport streams are sent to the main control section 21 via the buffer 320, and are supplied from the main control section 21 to the radio section 1 to be sent from the radio section 21 to a radio transmission channel.

On the other hand, the demultiplexer comprises the buffer 710, the TS separation section 740, the separation control section 760, and buffers 751 and 752 as shown in FIG. 2.

That is, the transport streams output from the main control section 21 are temporarily stored in the buffer 710. At the TS separation section 740, in accordance with the channel instruction information given from the separation control section 760, the PAT (PID=0x0000) is extracted from the received transport stream in the beginning. The PID of the PMT on which the control information of the designated program is described is detected from this PAT. Then, the PMT is extracted on the basis of his PID, and the PID of the video streams and the PID of the audio streams are respectively detected from the description of the PMT.

Next, the TS packet into which this PID is inserted is selectively extracted and separated from the received transport streams. These separated TS packets are input to the video decoder in the multimedia processor 24 and the audio decoder in the audio codec 23 via the buffers 751 and 752, respectively. The video decoder and the audio decoder conduct decode processing of the video data and the audio data by referring to the PTS stored in the buffers 751 and 752.

As has been described above, according to the second embodiment, in the case where video and voice communication is conducted by using the mobile communication terminal, the multiplexer/demultiplexer 22 detects the number of skipped frames between frames. Then, the PTS is calculated on the basis of the number of these skipped frames.

Consequently, even in the case where MPEG-4 is used wherein frame skips are likely to be generated as an encode scheme, the PTS of the video PES can be set to a correct value which corresponds to the input time of the original video data frame. Consequently, at the mobile communication terminal on the receiving side, the video data can be constantly reproduced at all times by referring to a time reference of the audio data. Consequently, high quality video and voice communication can be conducted.

Other Embodiments

An optional function of outputting elementary video streams including information representing the number of skipped frames, is made available for the video encoder. Then, at the multiplexer, information is extracted which represents the number of skipped frames from the elementary video streams output from the video encoder so that the number of skipped frames is recognized on the basis of this information, to calculate the PTS.

Furthermore, the structure of the first and the second embodiments can be applied to a software encoding system for conducting encode processing and multiplex processing with software. Then, it is possible to record on a computer readable recording medium a computer program in which the encode processing and multiplexing processing described in the first embodiment and the second embodiment are described so that the program is introduced to the computer and conducted through a recording medium or a communication medium. By doing so, the same effects as the first and second embodiments can be obtained.

Furthermore, in the first and second embodiments, there has been explained a case in which only MPEG-4 is used as the encode scheme. The present invention can be also applied to the case in which MPEG-4 is selectively used with other encode schemes such as MPEG-2 or the like. In this case, the parse-PES generation section determines whether or not the encode scheme which is being used is likely to generate the frame skip prior to the calculation processing of the PTS including the detection of the number of skipped frames. Then, only in the case where the encode scheme is used in which the frame skips are likely to be generated, the calculation processing of the PTS value including the detection of the number of skipped frames is conducted.

By doing so, in the case where the encode scheme is used in which the frame skip is not likely to be generated, the detection processing of the number of skipped frames can be omitted. Thus, the burden of the processing of the parse-PES generation section is alleviated so that the power consumption can be decreased.

Furthermore, in the above embodiments, there has been explained a case in which MPEG-4 is used as the encode scheme in which the frame skips are likely to be generated. The present invention can be applied even to the case where the other encode scheme such as ITU-T H-263 or the like is used.

In a similar manner, the present invention is not limited to the above embodiments. Various modifications can be put into practice within the scope of, and not departing from the gist of, the present invention. Furthermore, each of the above embodiments includes various inventions. Various inventions can be extracted with an appropriate combination of a plurality of constituent requirements which are to be disclosed. For example, even when several constituent requirements are eliminated from all the constituent requirements shown in each embodiment, objects described in the section on objects the invention is to solve can be solved. When the effect is obtained which is described in the section on the effect of the invention, the structure from which the constituent requirements are eliminated can be extracted as the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A multiplexer comprising:
    an encoder configured to encode frames of video data into encoded video data;
    a packetizing unit configured to packetize the encoded video data into a plurality of packets;
    a detecting unit configured to detect a number of skipped frames from the encoded video data, wherein the number of skipped frames is detected based upon the time difference between a current encoded frame and a previous encoded frame;
    a generating unit configured to generate a first time stamp or a second time stamp to be used for reproduction of a frame in the encoded video data, wherein the first time stamp is generated according to a given interval, in which no frame is skipped, and the second time stamp, which is used instead of the first time stamp so that a frame in the encoded video data is displayed at a time set when no frame is skipped, is generated based upon the number of skipped frames if the detecting unit detects that at least one frame has been skipped; and
    an inserting unit configured to insert one of the first time stamp and second time stamp into a header portion of the packet.

2. The multiplexer according to claim 1, wherein the time difference is calculated by subtracting local time information of the previous encoded frame from local time information of the current encoded frame, wherein the local time information is set by the encoder when each frame in the video data in inputted to the encoder.

3. A data communication apparatus for transmitting at least video data and audio data comprising:
    a video encoding unit configured to encode video frames of the video data into encoded video data;
    a first packetizing unit configured to packetize the encoded video data into a plurality of first packets;
    a detecting unit configured to detect a number of skipped frames from the encoded video data, wherein the number of skipped frames is detected based upon the time difference between a current encoded frame and a previous encoded frame;
    a generating unit configured to generate a first time stamp or a second time stamp to be used for reproduction of a frame in the encoded video data, wherein the first time stamp is generated according to a given interval, in which no frame is skipped, and the second time stamp, which is used instead of the first time stamp so that a frame in the encoded video data is displayed at a time set when no frame is skipped, is generated based upon the number of skipped frames if the detecting unit detects that at least one frame has been skipped;
    a first inserting unit configured to insert one of the first time stamp and second time stamp into a header portion of the first packet;
    a second packetizing unit configured to packetize the first packet into at least one second packet;
    an audio encoding unit configured to encode audio frames of the audio data into encoded audio data;
    a third packetizing unit configured to packetize the encoded audio data into a plurality of third packets;
    a generating unit configured to generate a third time stamp to be used for reproduction of a frame in the encoded audio data;

a second inserting unit configured to insert the third time stamp into a header portion of the third packet;

a fourth packetizing unit configured to packetize the third packet into at least one fourth packet; and a multiplexing unit configured to multiplex the second packets and the fourth packets.

4. The data communication apparatus according to claim 3, wherein the time difference is calculated by subtracting local time information of the previous encoded frame from local time information of the current encoded frame, wherein the local time information is set by the video encoding unit when each video frame is inputted to the video encoding unit.

5. The data communication apparatus according to claim 3, wherein each of the third time stamp is synchronized with one of the first time stamp and the second time stamp.

6. A data communication apparatus for transmitting at least video data comprising:

an encoding unit configured to encode frames of the video data into encoded data;

a first packetizing unit configured to packetize the encoded data into a plurality of first packets;

a detecting unit configured to detect the number of skipped frames from the encoded data, wherein the number of skipped frames is detected based upon the time difference between a current encoded frame and a previous encoded frame;

a generating unit configured to generate a first time stamp or a second time stamp to be used for reproduction of a frame in the encoded data, wherein the first time stamp is generated according to a given interval, in which no frame is skipped, and the second time stamp, which is used instead of the first time stamp so that a frame in the encoded data is displayed at a time set when no frame is skipped, is generated based upon the number of skipped frames if the detecting unit detects that at least one frame has been skipped;

an inserting unit configured to insert one of the first time stamp and second time stamp into a header portion of the first packet; and a second packetizing unit configured to packetize the first packet into at least one second packet.

7. The data communication apparatus according to claim 6, wherein the time difference is calculated by subtracting local time information of the previous encoded frame from local time information of the current encoded frame, wherein the local time information is set by the encoding unit when each frame is inputted to the encoding unit.

* * * * *

UNITED STATES PATENT AND TRADEMARK OFFICE
CERTIFICATE OF CORRECTION

| | | |
|---|---|---|
| PATENT NO. | : 7,742,481 B2 | |
| APPLICATION NO. | : 11/218422 | |
| DATED | : June 22, 2010 | |
| INVENTOR(S) | : Saito | |

It is certified that error appears in the above-identified patent and that said Letters Patent is hereby corrected as shown below:

In the Claims

Claim 2, column 12, lines 32-33, change "data in inputted" to --data is inputted--.

Signed and Sealed this
Twenty-eighth Day of May, 2013

Teresa Stanek Rea
*Acting Director of the United States Patent and Trademark Office*